US007786030B2

(12) United States Patent
Tsuchiya

(10) Patent No.: US 7,786,030 B2
(45) Date of Patent: Aug. 31, 2010

(54) CLEANING TOOL

(75) Inventor: Akemi Tsuchiya, Kagawa (JP)

(73) Assignee: Uni-Charm Corporation, Ehime (JP)

( * ) Notice: Subject to any disclaimer, the term of this patent is extended or adjusted under 35 U.S.C. 154(b) by 1028 days.

(21) Appl. No.: 11/039,059

(22) Filed: Jan. 18, 2005

(65) Prior Publication Data

US 2006/0048325 A1 Mar. 9, 2006

(30) Foreign Application Priority Data

Sep. 9, 2004 (JP) ............................ 2004-262897

(51) Int. Cl.
*A47L 13/10* (2006.01)
*A47L 13/12* (2006.01)
*A47L 13/16* (2006.01)
*A47L 13/17* (2006.01)
*A47L 13/38* (2006.01)
*B32B 5/28* (2006.01)

(52) U.S. Cl. .......................... 442/123; 442/59; 442/61; 442/381; 442/392; 15/229.3; 15/209.1; 15/226; 15/227; 15/229.1

(58) Field of Classification Search ....................... None
See application file for complete search history.

(56) References Cited

U.S. PATENT DOCUMENTS 3,200,036 A * 8/1965 Greenblatt ............... 15/104.93
4,806,526 A 2/1989 Green
4,977,142 A 12/1990 Green
6,482,357 B1 11/2002 Fox et al.
6,777,064 B1 8/2004 Brown et al.
2002/0148061 A1* 10/2002 Tanaka et al. .............. 15/229.3
2006/0048325 A1 3/2006 Tsuchiya

FOREIGN PATENT DOCUMENTS

| | | | |
|---|---|---|---|
| EP | 0 168 243 B1 | | 2/1990 |
| JP | 53-37471 | | 10/1978 |
| JP | 57-39825 A | | 3/1982 |
| JP | 61-44821 A | | 3/1986 |
| JP | 06-220429 | | 8/1994 |
| JP | 09-066014 A | | 3/1997 |
| JP | 09-164101 A | | 6/1997 |
| JP | 09-313416 | | 12/1997 |
| JP | 10-75924 A | | 3/1998 |
| JP | 10075924 A | * | 3/1998 |
| JP | 10-272082 | | 10/1998 |
| JP | 11-033089 | | 2/1999 |
| JP | 11-99088 A1 | | 4/1999 |

(Continued)

OTHER PUBLICATIONS

Dictionary definition of “mop”, http://dictionary.reference.com/search?q=MOP&r=66 , 2006.

(Continued)

*Primary Examiner*—Jennifer A Chriss
(74) *Attorney, Agent, or Firm*—Brinks Hofer Gilson & Lione

(57) ABSTRACT

The present invention provides an indoor cleaning tool having a dry fibrous base material. An antigenicity-reducing composition that includes an antigenicity-reducing component, a lubricant, and a surfactant is applied to the fibrous base material. It would be preferable for the antigenicity-reducing component to be tannic acid.

7 Claims, 4 Drawing Sheets

FOREIGN PATENT DOCUMENTS

| | | | |
|---|---|---|---|
| JP | 11-235301 | A1 | 8/1999 |
| JP | 2000-102492 | A1 | 4/2000 |
| JP | 2002-326944 | A1 | 11/2002 |
| JP | 2002-369783 | A1 | 12/2002 |
| JP | 2003-55122 | A1 | 2/2003 |
| JP | 2003-79554 | A | 3/2003 |
| JP | 2003-261899 | A1 | 9/2003 |
| JP | 2003-265389 | A1 | 9/2003 |
| JP | 2003-334240 | A1 | 11/2003 |
| JP | 2004-81840 | A | 3/2004 |
| JP | 2004-283338 | | 10/2004 |
| JP | 2006-75361 | A | 3/2006 |
| WO | WO-2004/005423 | A1 | 1/2004 |

OTHER PUBLICATIONS http://web.archive.org/web/*/http://www.swiffer.co (Web Publication Date: Mar. 31, 2001). Date Accessed: May 4, 2007.

Office Action issued to JP Patent Application No. 2004-358952, mailed on Feb. 9, 2010 Office Action issued to U.S. Appl. No. 11/039,770 mailed on Dec. 17, 2009.

Thesaurus synonyms of “brush”, http://thesaurus.reference.com/browse/brush , 2007.

* cited by examiner

CLEANING TOOL

INCORPORATION BY REFERENCE

The present application claims priority under 35 U.S.C. §119 to Japanese Patent Application No. 2004-262897 filed on Sep. 9, 2004. The content of the application is incorporated herein by reference in its entirety.

BACKGROUND OF THE INVENTION

The present invention relates to an indoor cleaning tool equipped with a fibrous base material. More specifically, the present invention relates to a cleaning tool that can reduce the antigenicity of matter that can provoke allergies.

In recent years, there has been a steady increase in the number of people afflicted with allergic diseases such as allergic rhinitis and bronchial asthma. The matter that provokes these allergic diseases is referred to as allergens, of which already approximately 200 types have been discovered today. Mites, mite carcasses, pet hair, and pollen are typical examples. These can provoke various allergic reactions through contact with or entry into the body.

In these cases, using chemicals or the like to kill the mites and the like that provoke allergies does not provide a complete solution since the mite carcasses also have antigenicity. Thus, reducing allergic reactions and preventing new sensitivities from developing requires either completely removing allergens from the living space or reducing the antigenicity of matter that provokes allergies by denaturing allergens or the like.

Examples of an agent for reducing antigenicity of allergy-inducing matter as described above that have been disclosed include allergen inactivating agents made from *Olea europaea* and/or *Ligustrum* obtusifolium (Japanese laid-open patent publication number 2003-55122—Patent Document 1).

Also, there have been disclosed antigenicity-reducing agents formed as agents that can be applied or dispersed in an aqueous state onto floors, carpets, and floor mats in the form of an aqueous solution containing aluminum sulfate and sodium sulfate as the active components (Japanese laid-open patent publication number 2003-334240—Patent Document 2).

With cleaning tools such as dust cloths, mops, and wipers used to remove indoor dust and particles, allergens become adhesed to the cleaning tool during cleaning and stay on the cleaning tool for an extended time. As described above, reducing or preventing allergic reactions would require reducing the antigenicity of the allergens on the cleaning tool.

However, the agents in Patent Document 1 and 2 are all used by applying or dispersing them directly on places that can come into contact with the body, e.g., floor mats, carpets, floors, clothes. This makes it necessary to wipe away the agent or to remove it with a vacuum cleaner after application, resulting in a burden on the user. Easy elimination of allergy-inducing matter in the cleaning of dust and particles on floors and furniture that are cleaned most often has not been investigated. Also, since the conventional methods moisten the object being cleaned, the object must then be dried. Dry cleaning methods for reducing allergy-inducing matter have not been proposed. Furthermore, no research has been done on reducing antigenicity of allergy-inducing matter contained in dust and particles collected on dry cleaning tools such as mops.

More specifically, with indoor cleaning tools, disposable and replaceable tools are possible. Dry tools equipped with fibrous base materials in sheet or brush form that contain essentially no moisture have been well-received in the market. With these dry cleaning tools, there is a need for the antigenicity-reducing composition to be adhesive to and permeable in the fibrous base material, and the transfer of the composition to the object being cleaned must be minimal.

The Patent Document 1 does not take into account the adhesiveness or the permeability of the composition. Also, the allergen-reducing agent in the Patent Document 2 is meant to be used as an aqueous fluid, i.e., in a "wet" state, and is not easily applicable to a dry cleaning tool that contain essentially no moisture.

OBJECT AND SUMMARY OF THE INVENTION

The object of the present invention is to overcome these problems and to provide a cleaning tool that can reduce the antigenicity of allergy-inducing matter adhesed to the cleaning tool.

Based on careful research into overcoming the problems described above, the present inventors determined that the problems can be solved by applying an antigenicity-reducing component as a predetermined composition containing a lubricant and surfactant, resulting in the present invention. More specifically, the present invention provides the following.

(1) The present invention provides an indoor cleaning wiping tool equipped with a dry fibrous base material. In the cleaning tool, an antigenicity-reducing composition is applied to the fibrous base material. The antigenicity-reducing composition contains an antigenicity-reducing component reducing antigenicity of allergy-inducing matter, a lubricant, and a surfactant. The antigenicity-reducing component is tannic acid.

Since the cleaning tool uses an antigenicity-reducing composition containing an antigenicity-reducing component reducing antigenicity of allergy-inducing matter, a lubricant, and a surfactant, this composition can be applied easily to a "dry-type" fibrous base material. Also, by applying the composition in this state, the antigenicity-reducing effect can be maintained in a stable manner over a long period of time. Also, by applying less composition, transfer of the composition during cleaning from the fibrous base material to the object being cleaned can be prevented. Tannic acid is believed to reduce antigenicity by the bonding of the hydroxyl group of the polyphenol with the amino group and the peptide group of the allergen protein. Also, tannic acid is inexpensive and can be easily obtained. Furthermore, since it is plant-derived, a high degree of human safety is provided.

In the present invention, "dry-type" refers to the lubricant having a greater proportion by weight than the moisture in the antigenicity-reducing composition, and a proportion of 5.0% moisture or less would be appropriate. The moisture must be solubilized in the lubricant. If the lubricant is emulsified, dust collection performance is reduced, making it undesirable.

(2) A cleaning tool as described in (1) wherein the surfactant is a nonionic surfactant.

With this, the antigenicity-reducing component and lubricants can be mixed in a stable manner.

(3) A cleaning tool as described in (1) or (2) wherein the lubricant is a dust-adhesive lubricant. Also, (4) a cleaning tool as described in any one of (1) through (3) wherein the lubricant is a mineral oil.

By using a dust-adhesive lubricant or a mineral oil as the lubricant, adhesion of the antigenicity-reducing composition to the fibrous base material is made easier. Also, disengagement of the antigenicity-reducing composition from the fibrous base material to which it is applied and transfer to the object being cleaned can be effectively prevented. Also, dust collection is improved and dust is prevented from falling away once collected.

(5) A cleaning tool as described in (4) wherein the mineral oil has a viscosity of 10-200 $mm^2$/s at 30 deg C.

It would be preferable for the viscosity of the mineral oil to be 10-200 $mm^2$/S at 30 deg C., and 15-120 $mm^2$/s more preferably. If the viscosity is less than 10 $mm^2$/S, the composition may be transferred excessively to the object being cleaned and can adhere to hands, resulting in a sticky feeling. If the viscosity exceeds 200 $mm^2$, dust adsorption is reduced.

(6) A cleaning tool as described in any one of (1) through (5) wherein the antigenicity-reducing component is 0.01-10 percent by mass, the lubricant is 50-95 percent by mass, and the surfactant is 1-50 percent by mass relative to the entire antigenicity-reducing composition.

By using these proportions, dust can be collected using the dust-adhesive capabilities of the fibrous base material itself as well as the lubricant. Furthermore, the antigenicity-reducing composition can reduce the antigenicity of allergy-inducing matter contained in the collected dust.

(7) A cleaning tool as described in (6) wherein the antigenicity-reducing composition is 1-15 percent by mass relative to the entire fibrous base material to which the antigenicity-reducing composition is applied.

By having the antigenicity-reducing composition be at least 1 percent by mass relative to the entire fibrous base material, adequate antigenicity reduction can be provided. Since the proportion of antigenicity-reducing component that is added in this case would be 0.01-10 percent by mass, a suitable effect can be provided with a very small amount of the antigenicity-reducing component.

By having the antigenicity-reducing composition be 15 percent by mass or less relative to the entire fibrous base material, transfer of the antigenicity-reducing composition to the object being cleaned due to excessive adhesion of the antigenicity-reducing composition can be prevented.

The present invention is able to provide a cleaning tool that can reduce the antigenicity of allergy-inducing matter adhesed to the cleaning tool.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Antigenicity-Reducing Composition

Figure 1:
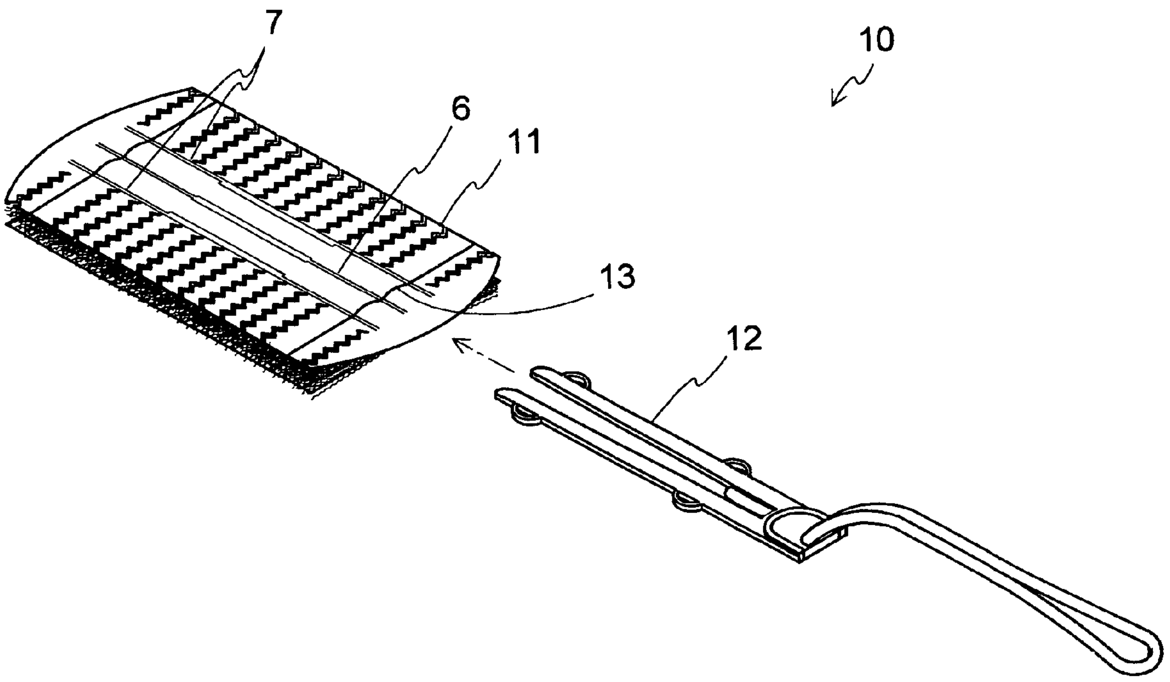
FIG. 1 is a perspective drawing showing an example of a cleaning tool according to the present invention.

The antigenicity-reducing composition applied to the cleaning tool of the present invention includes: (a) an antigenicity-reducing component that reduces the antigenicity of allergy-inducing matter; (b) a lubricant; and (c) a surfactant. These components will be described below.

Antigenicity-reducing Component

The "antigenicity-reducing component" used in the present invention limits allergic reactions by reducing the antigenicity of allergy-inducing matter. The component is a plant-derivative component. The allergy-inducing matter (allergen) can be, e.g., cedar pollen, grass pollen, and inhaled allergens such as mites, house dust, animals, fungi (mold), and insects.

In the present invention, tannic acid is used as the antigenicity-reducing component.

The tannic acid disclosed in Japanese Examined Patent Application Publication Number Hei 2-16731 can be used as the tannic acid here. Tannic acid is believed to reduce antigenicity by the bonding of the hydroxyl group of the polyphenol with the amino group and the peptide group of the allergen protein.

This antigenicity-reducing component can be used as an independent component or can be used to prepare an antigenicity-reducing composition. It can be prepared as prepared as a solution containing the active element and an extract fluid thereof.

Lubricant

The "lubricant" used in the present invention is added to increase adsorption and retention of dust and particles. There are no particular restrictions on the type of lubricant, but it would be preferable to include at least one out of the following: mineral oil; silicone oil; and plant oil. Examples of mineral oil include paraffin-based hydrocarbons, naphthene-based hydrocarbons, and aromatic hydrocarbons. These lubricants can be used independently or two or more types can be mixed.

Of these, using liquid paraffin as the main component of the lubricant is preferable because it makes adhesion of the antigenicity-reducing component to the fibrous base material easier. Furthermore, once the antigenicity-reducing component is applied to the fibrous base material, the component is prevented from disengaging and getting caught in the object being cleaned.

Surfactant

The "surfactant" used in the present invention is added to allow easy application to the cleaning tool and to make the composition uniform. It would be preferable to use a nonionic activator. There are no special restrictions on the nonionic surfactants, but examples of preferable polyoxyethylene alkyl ether include: polyoxyethylene lauryl ether; polyoxyethylene cetyl ether; polyoxyethylene oleyl ether; and polyoxyethylene stearyl ether. Examples of preferable sorbitan esters include: sorbitan laurate monoester; sorbitan monoester of palmitic acid; sorbitan monoester of stearic acid; and sorbitan monoester of oleic acid. Examples of preferable glycerine fatty acid esters include: mono myristic acid glyceryl; mono stearic acid glyceryl; mono oleic acid glyceryl; mono isostearic acid glyceryl; and di oleic acid glyceryl. Examples of preferable vegetable oils include: jojoba oil; avocado oil; olive oil; persic oil; grape seed oil; safflower oil; and sunflower oil. Examples of sorbitan trioleate include: sorbitan triester of stearic acid; and sorbitan triester of oleic acid. Examples of preferable EO additives to castor oil or hydrogenated castor oil include: polyoxyethylene hydrogenated castor oil; lauric acid polyoxyethylene hydrogenated castor oil; and mono isostearic acid polyoxyethylene hydrogenated castor oil. These surfactants can be used independently or two or more types can be mixed.

Other Components

Components other than the plant-derived antigenicity-reducing compounds, lubricants, and surfactant described above can also be used in the antigenicity-reducing composition of the present invention as long as they do not significantly alter the characteristics of the composition.

Preparation of Antigenicity-reducing Composition

The components described above are mixed/agitated using conventional, known methods to form the antigenicity-reducing composition. The preferable proportions relative to the overall antigenicity-reducing composition of the three necessary components described above, i.e., the antigenicity-reducing component, the lubricant, and the surfactant, are as follows: 0.01-10 percent by mass of the antigenicity-reducing component; 50-95 percent by mass of the lubricant; and 1-50 percent by mass of the surfactant. More preferable is: 0.02-1 percent by mass of the antigenicity-reducing component; 60-80 percent by mass of the lubricant; and 20-40 percent by mass of the surfactant.

Using less than 0.01 percent by mass of the antigenicity-reducing component is not preferable since the antigenicity reduction for the collected particles is inadequate. A proportion greater than 10 percent by mass results in instability over time in the antigenicity-reducing composition and also increases cost.

Using less than 50 percent by mass of the lubricant is not preferable since the lubricant provides inadequate improvement in the adhesion of dust and the like. A proportion greater than 95 percent by mass results in instability over time in the antigenicity-reducing composition and is therefore not preferable.

Using less than 1 percent by mass of the surfactant is not preferable because of instability over time in the antigenicity-reducing composition. More than 50 percent by mass reduces the amount of lubricant that can be added and is therefore not preferable.

Cleaning Tool

Next, a cleaning tool to which the above antigenicity-reducing composition is applied will be described. There are no special restrictions on the cleaning tool as long as it is a "dry-type" cleaning tool, i.e., an indoor cleaning tool having a fibrous base material that contains essentially no water. For example, the cleaning tool can be sheet-shaped or the sheet can be cut in strips, can be formed from multiple string-shaped elements such as in a mop, or can be tow fiber (a collection of fibers). There are also no special restrictions on the fibrous base material, which can be formed from natural fiber, synthetic fiber, or semi-synthetic fiber. Also, there are no special restrictions on the form of the fiber, which can be woven, knitted, or nonwoven.

Examples of Cleaning Tools

Figure 2:
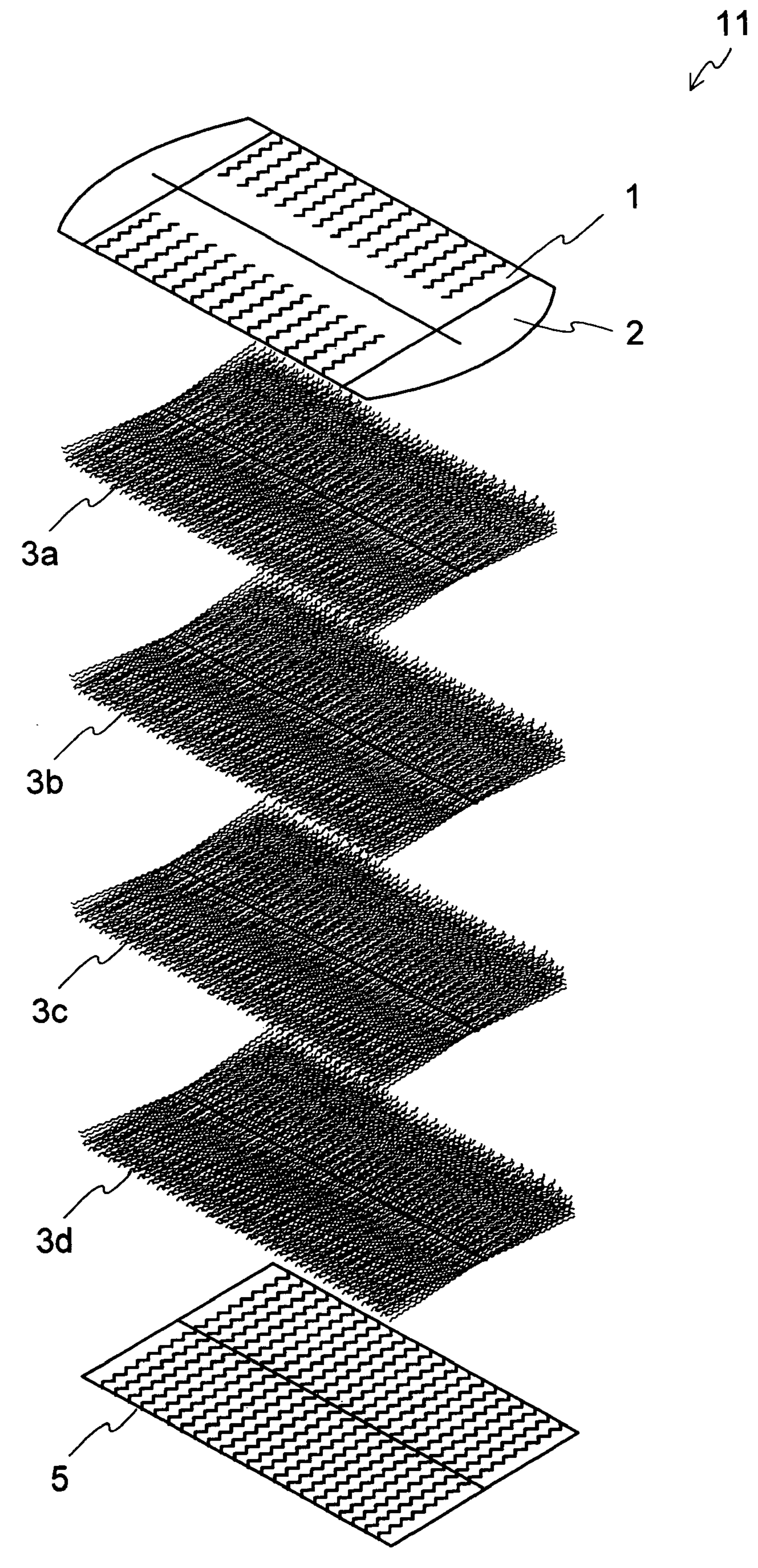
FIG. 2 is an exploded perspective drawing of the fibrous base material in FIG. 1.
Figure 3:
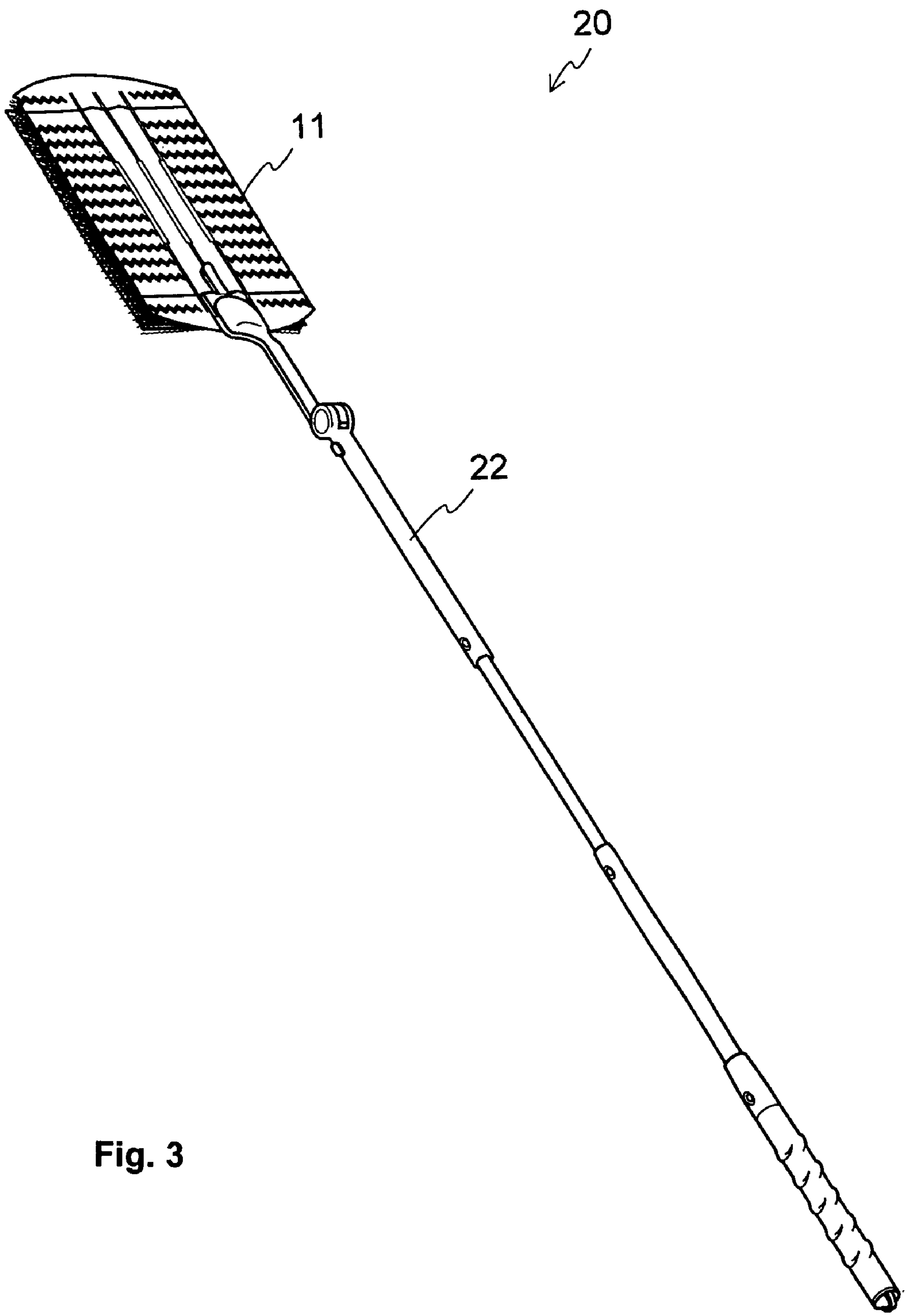
FIG. 3 is a perspective drawing showing another example of a cleaning tool according to the present invention.

FIG. 1 and FIG. 2 show an example of this type of cleaning tool. FIG. 1 is a perspective drawing of the cleaning tool. FIG. 2 is an exploded perspective drawing of a cleaning sheet from FIG. 1. A cleaning tool 10 is a "handy-type" cleaning tool and is formed from: a cleaning sheet 11, which corresponds to the fibrous base material of the present invention; and a grasping tool 12. The grasping tool 12 is interchangeable. For example, a grasping tool 22 shown in FIG. 3 can be mounted to allow the cleaning tool in FIG. 1 to be used in high places or narrow places that are difficult to reach.

As shown in FIG. 2, the cleaning sheet 11 is formed from the following layers, starting in sequence from the top: a protective sheet 1 formed from nonwoven cloth cut into multiple strips; a base sheet 2 also formed from nonwoven cloth cut into multiple strips; a first fiber bundle 3*a* formed from tow fiber; a second fiber bundle 3*b* formed from tow fiber; a third fiber bundle 3*c* formed from tow fiber; a fourth fiber bundle 3*d* formed from tow fiber; and a strip sheet 5 in which multiple strips are formed. In this embodiment, the first fiber bundle 3*a*, the second fiber bundle 3*b*, the third fiber bundle 3*c*, and the fourth fiber bundle 3*d* form the brush section of the present invention. Thus, this brush section provides more effective cleaning. Since the antigenicity-reducing composition need only be applied to this brush section, the antigenicity-reducing composition can be applied more efficiently. The "brush section" referred to here is the section that performs the primary cleaning function in the cleaning tool of the present invention. The brush section can be a portion or all of the fibrous base material. The protective sheet 1, the base material sheet 2, the first fiber bundle 3*a*, the second fiber bundle 3*b*, the third fiber bundle 3*c*, the fourth fiber bundle 3*d*, and the strip sheet 5 are all bonded together at a layer bonding line 6. At bonding lines 7, only the protective sheet 1, the base material sheet 2, the first fiber bundle 3*a*, and the second fiber bundle 3*b* are bonded. As a result, a holding space 13 is formed between the protective sheet 1 and the base material sheet 2, allowing the grasping tool 12 to be inserted and mounted. In this type of "handy-type" cleaning tool 10, 20, it would be preferable for the antigenicity-reducing composition to be applied only to the brush section formed from the first fiber bundle 3*a*, the second fiber bundle 3*b*, the third fiber bundle 3*c*, and the fourth fiber bundle 3*d*.

Another Example of a Cleaning Tool

Figure 4:
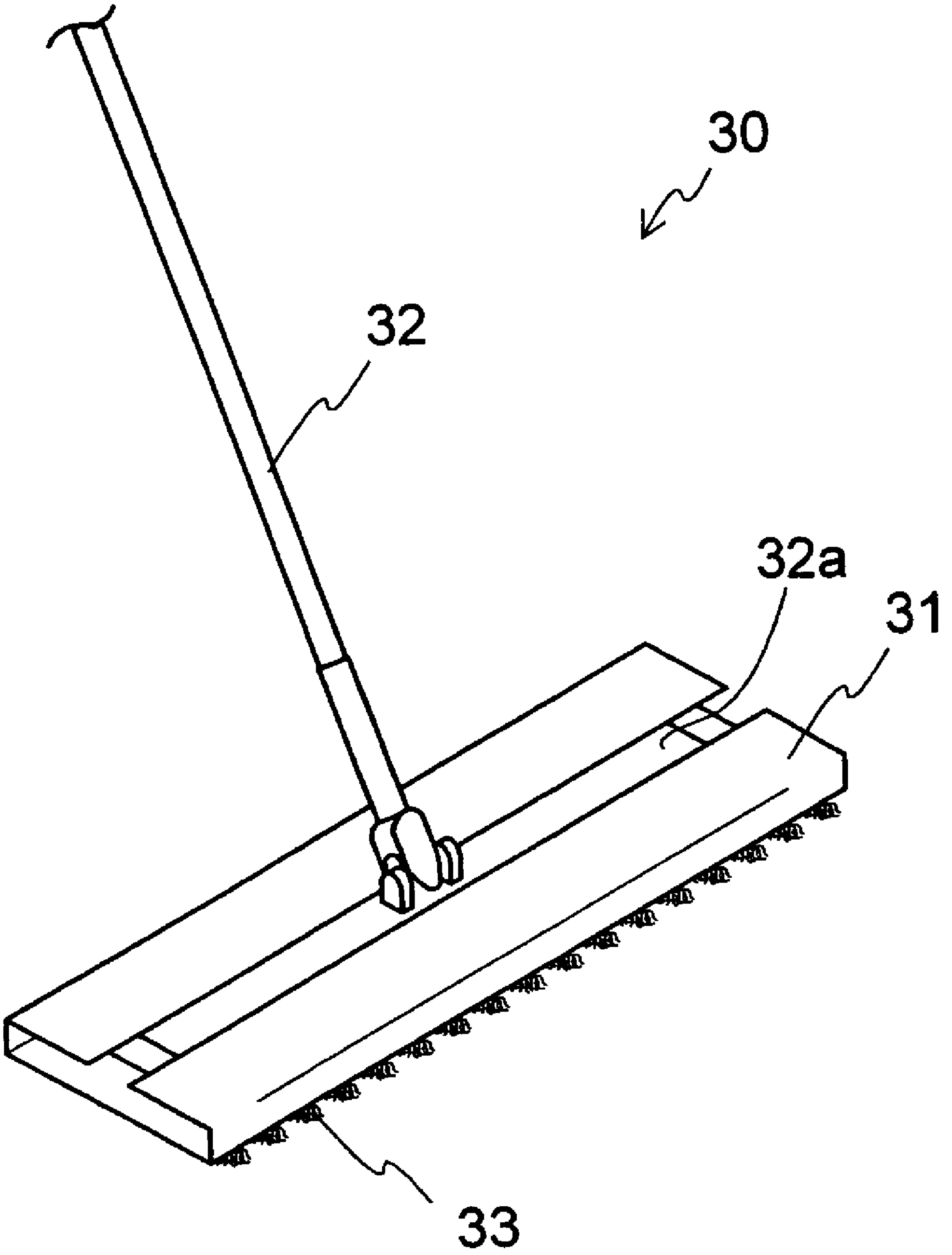
FIG. 4 is a perspective drawing showing another example of a cleaning tool according to the present invention.

FIG. 4 shows another example of a cleaning tool in the form of a floor-type cleaning tool 30 suitable for cleaning floors. As shown in FIG. 4, in this cleaning tool 30 a cleaning sheet 31 corresponding to the fiber base material of the present invention is wrapped around an end 32*a* of a grasping tool 32 and used. Projections 33 made from tows are formed on the front and back of the cleaning sheet 31. This makes it easier to clean places that would be difficult to clean with a flat tool, e.g., grooves. By simply placing the cleaning tool 30 in contact with a floor or the like, the cleaning sheet 31 is able to collect particles and the like. In this type of "floor-type" cleaning tool 30, it would be preferable to apply the antigenicity-reducing composition to the entire cleaning sheet 31.

Application of Antigenicity-reducing Composition

Examples of methods for applying the antigenicity-reducing composition to the cleaning tool described above include spraying or roller-coating the antigenicity-reducing composition onto the fibrous base material, immersion, and the like, but the present invention is not restricted to these methods.

For the handy-type cleaning tool shown in FIG. 1, a preferable amount of antigenicity-reducing composition to be applied is 1-10 percent by mass relative to the entire fibrous base material. At 1 percent by mass or less, powder-type dust cannot be collected, while at 10 percent by mass or more, a large amount of the composition is transferred to the object being cleaned and can adhere to hands, resulting in stickiness. In floor-type cleaning tools as shown in FIG. 4, slightly more antigenicity-reducing composition can be applied, with the preferable range being 3-15 percent by mass relative to the entire fibrous base material. At 3 percent by mass or less, powder-type dust cannot be collected, while at 15 percent by mass or more, a large amount of the antigenicity-reducing composition is transferred to the object being cleaned and can adhere to hands, resulting in stickiness.

The present invention will be described in further detail using embodiments and comparative examples. The present invention, however, is not restricted to the embodiments described below.

Making the Antigenicity-reducing Agent Containing the Antigenicity-reducing Component (Tannic Acid)

Tannic acid (from Wako Pure Chemical Industries, Ltd.) is dissolved in water and ethanol to prepare 15% tannic acid.

Making the Antigenicity-reducing Composition

Using an antigenicity-reducing composition in which tannic acid is the antigenicity-reducing component, antigenicity-reducing comound production samples 1 through 3 were prepared using the proportions shown in Table 1.

Liquid paraffin and/or safflower oil is used as the lubricant. For the surfactant, at least one of the following is used: polyoxyethylene alkyl ether, sorbitan monoester of oleic acid, mono isostearic acid glyceryl, sorbitan triester of oleic acid, and polyoxyethylene hydrogenated castor oil. In addition, water was mixed in and agitated to prepare the antigenicity-reducing composition.

TABLE 1

| | | Amount of antigenicity-reducing composition (units: % by mass) | | | | | | | | | |
|---|---|---|---|---|---|---|---|---|---|---|---|
| Name | Test sample | Polyoxy-ethylene-alkyl ether Note 2) | Sorbitan oleic acid monoester | Liquid paraffin Note 3) | Water | Antigenicity-reducing component Note 1) | Mono isostearic acid glyceryl | Safflower oil | Sorbitan oleic acid triester | Polyoxy-ethylene hydrogenated castor oil Note 4) | Polyoxy-ethylene alkyl ether Note 5) |
| Standard lubricant | Production sample 4 | 0.8 | 1.2 | 98 | — | — | — | — | — | — | — |
| Tannic acid composition | Production sample 1 | 0.8 | 2 | 92.6 | 0.2 | 0.1 | 1 | — | 0.8 | 1 | 1.5 |
| | Production sample 2 | 0.7 | 4.8 | 74.4 | 0.2 | 3.9 | 4 | 2 | 3.5 | 2 | 4.5 |

Note 1)
(Tannic acid): Tannic acid (Wako Pure Chemical Industries, Ltd.) was dissolved in water and ethanol to prepare 15% tannic acid.
Note 2)
Polyoxyethylene alkyl ether: 5 moles (EO). The number of carbon atoms in the alkyl group is 12-14.
Note 3)
50 $mm^2/s$ viscosity at 30 deg C.
Note 4)
Polyoxyethylene hydrogenated castor oil 60 moles (EO).
Note 5)
Polyoxyethylene alkyl ether: 3 moles (EO). The number of carbon atoms in the alkyl group is 12-14.

Application of the Antigenicity-reducing Composition to the Cleaning Tool

Next, the antigenicity-reducing composition production samples 1 and 2 and the composition production sample 3 are sprayed onto the cleaning tool shown in FIG. 1 (hereinafter referred to as the "handy-type"), and onto the cleaning tool shown in FIG. 4 (hereinafter referred to as the "floor-type"). For each type, a first and second cleaning tool embodiment (tools on which production samples 1 and 2 were applied) and a first comparative example (tools on which the production sample 3 was applied) were obtained.

For the handy-type tools, 5 percent by mass was applied relative to the entire fibrous base material (the sheet 11 in FIG. 1). For the floor-type tools, 7.5 percent by mass of the antigenicity-reducing composition was applied relative to the entire fibrous base material (the sheet 31 in FIG. 4).

EVALUATION

Evaluation 1: Evaluation of Antigenicity-reducing Performance

Antigenicity-reducing performance on cedar pollen and dust mites was evaluated for the first and third embodiments and the first comparative sample using the procedure described below. The results are shown in Tables 2 and 3. In the tables, the reduction rates are determined as 100-100× (ELISA allergen volume from a cleaning tool to which antigenicity-reducing agent was applied)/(ELISA allergen volume from a cleaning tool to which no antigenicity-reducing agent was applied). The symbols in the tables indicate the following reduction rates:

Circle: good reduction rate (50% or higher)
Triangle: inferior reduction rate (10-50%)
X: bad reduction rate (0-10%)

Handy-type: Debris containing approximately 0.05 g of mite allergens (dust mites) and approximately 0.01 g cedar pollen were placed in a glass bottle having a diameter of 9 cm and a height of 17 cm. The bottle was capped and the debris and cedar pollen were dispersed throughout the bottle. The top was removed and the handy-type cleaning tool was used to wipe away the debris and cedar pollen. An extraction fluid was used on the cleaning tool to extract the allergens and the allergens were quantified using the ELISA method.

Floor-type: Debris containing approximately 0.05 g of mite allergens (dust mites) and approximately 0.01 g cedar pollen were placed on a floor panel approximately 30 cm×30 cm. The debris and the cedar pollen were wiped away with the floor-type cleaning tool. An extraction fluid was used on the cleaning tool to extract the allergens and the allergens were quantified using the ELISA method.

A phosphoric acid buffering agent (pH7) was used as the extraction fluid. Also, the ELISA method (enzyme-linked immunosorbent assay) is a type of quantification method (EIA: enzyme immunoassay) that uses enzyme color formation that takes place in antigen-antibody reactions.

TABLE 2

| Cedar pollen antigenicity reduction rate | | |
|---|---|---|
| | Reduction rate | |
| Test sample | Hand-held | Floor |
| Comp. sample 1 | x | x |
| Embodiment 1 | Δ | Δ |
| Embodiment 2 | ○ | ○ |

TABLE 3

| Mite antigenicity reduction rate | | |
|---|---|---|
| | Reduction rate | |
| Test sample | Hand-held | Floor |
| Comp. sample 1 | x | x |
| Embodiment 1 | x | Δ |
| Embodiment 2 | ○ | ○ |

Based on the results from Table 2 and Table 3, it was found that the floor-type cleaning tool provided reductions with each of the antigenicity-reducing compositions. In the handy-type cleaning tool of the first embodiment, however, not as much of the antigenicity-reducing component was applied and the effect was somewhat less.

Evaluation 2: Evaluation of Reductions After Exposure to Heating and Light

Heating test: For the cleaning tools in the second and third embodiment, the fibrous base material was placed by itself in a paper housing and covered for the handy-type cleaning tools and in a pillow-type covering made from film for the floor-type cleaning tool. The packages were left indoors away from direct light, in a thermostatic chamber at 40 deg C., and in a thermostatic chamber at 50 deg C. Then, after one month, allergens were measured using the same method as in the Evaluation 1.

Light test: For the handy-type and floor-type cleaning tools, the sheets were left unpackaged under a xenon lamp weather meter for the equivalent of one month under sunlight and six months under sunlight. Allergens were measured using the same method as in the Evaluation 1.

Results are shown in Table 4, with the reduction rates and symbols in the table indicating the same things as in Tables 2, 3. For both the cleaning tools of the second and third embodiment, the reduction effect was maintained after exposure to heating for one month. The reduction effect was also maintained after exposure to sunlight.

TABLE 4

| Mite antigenicity reduction rate | | | |
|---|---|---|---|
| | | Embodiment 2 | |
| Condition | Elapsed time | Hand-held | Floor |
| Immediately after application | 0 days | ○ | ○ |
| RT | One month | ○ | ○ |
| 40 deg C. | One month | ○ | ○ |
| 50 deg C. | One month | ○ | ○ |
| Light exposure | One month equivalent | ○ | ○ |
| Light exposure | Six months equivalent | ○ | — |

The present invention is suitable for use as an indoor cleaning tool having a fibrous base material.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A cleaning tool for indoor cleaning comprising:

a fibrous base material having a brush section including a fiber bundle having four or fewer bundles and having a bonding line to form the fibrous base material; and an antigenicity-reducing composition applied to at least the brush section of said fibrous base material, wherein said antigenicity-reducing composition has an antigenicity-reducing component for reducing antigenicity of allergy-inducing matter, a lubricant, and a surfactant, wherein said antigenicity-reducing component is tannic acid, said surfactant is a nonionic surfactant, and said lubricant has liquid paraffin as predominant component, wherein said antigenicity-reducing component is in a range of 0.01 to 10 percent by mass, said lubricant is in a range of 50 to 95 percent by mass, and said surfactant is in a range of 1 to 50 percent by mass relative to the entire antigenicity-reducing composition.

2. A cleaning tool as described in claim 1 wherein said lubricant having liquid paraffin as predominant component has a viscosity of 50 $mm^2/s$ at 30 deg C.

3. A cleaning tool as described in claim 1 wherein said antigenicity-reducing component is 0.02-1 percent by mass, said lubricant is 60-80 percent by mass, and said surfactant is 20-40 percent by mass relative to the entire antigenicity-reducing composition.

4. A cleaning tool according to claim 1, wherein the percent by mass of the antigenicity-reducing component relative to the entire fibrous base material is from 1 to 15 percent by mass.

5. A cleaning tool according to claim 4, wherein the antigenicity-reducing composition is applied only to the fiber bundle.

6. A cleaning tool according to claim 1, further comprising a grasping tool, wherein the fibrous base material comprises a holding space formed between the protective sheet and the base sheet allowing the grasping tool to be inserted and mounted in the holding space.

7. A cleaning tool for indoor cleaning comprising:

a fibrous base material having a brush section comprising four or fewer layers of fiber bundle members;

a protective sheet formed from nonwoven cloth cut into multiple strips;

a base sheet formed from nonwoven cloth cut into multiple strips;

the base sheet is between the protective sheet and the brush section;

a strip sheet in which multiple strips are formed;

the brush section is between the base sheet and the strip sheet;

a layer bonding line, wherein said bonding line bonds the protective sheet, base sheet, the fiber bundle members, and the strip sheet together;

a bonding line which the protective sheet, the base sheet, a first fiber bundle member and a second fiber bundle member are bonded together;

a holding space between the base sheet and the protective sheet, formed by the layer bonding line and the bonding line;

a grasping implement that is configured to be inserted into the holding space allowing to mount on to the fibrous base material; and an antigenicity-reducing composition applied to at least the brush section of said fibrous base material, wherein said antigenicity-reducing composition has an antigenicity-reducing component for reducing antigenicity of allergy-inducing matter, a lubricant, and a surfactant, wherein said antigenicity-reducing component is tannic acid, said surfactant is a nonionic surfactant, and said lubricant has liquid paraffin as predominant component, wherein said antigenicity-reducing component is in a range of 0.01 to 10 percent by mass, said lubricant is in a range of 50 to 95 percent by mass, and said surfactant is in a range of 1 to 50 percent by mass relative to the entire antigenicity-reducing composition.

* * * * *